United States Patent
Chuang

(10) Patent No.: US 7,602,402 B2
(45) Date of Patent: Oct. 13, 2009

(54) METHOD OF DISPLAYING COLORS OF GRAPHIC OBJECTS ON SCREEN CONTROL DISPLAY

(75) Inventor: Cheng-Wei Chuang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 393 days.

(21) Appl. No.: 11/600,179

(22) Filed: Nov. 16, 2006

(65) Prior Publication Data

US 2007/0115296 A1 May 24, 2007

(30) Foreign Application Priority Data

Nov. 18, 2005 (TW) .............................. 94140679 A

(51) Int. Cl.
- G09G 5/00 (2006.01)
- G09G 5/02 (2006.01)
- G06F 5/00 (2006.01)
- G06F 3/048 (2006.01)
- G06F 17/00 (2006.01)
- G06K 9/00 (2006.01)
- G06K 9/36 (2006.01)

(52) U.S. Cl. .................. 345/589; 345/581; 345/593; 345/601; 345/549; 348/557; 348/562; 348/598; 382/162; 382/165; 715/764; 715/783; 715/810; 715/841

(58) Field of Classification Search ................ 715/200, 715/700, 712–713, 762–764, 855, 783, 810, 715/818–821, 825, 835, 841; 345/581, 589, 345/593, 597, 600–601, 605–606, 629–630, 345/636, 549; 382/162, 165; 358/518–519; 348/557, 560

See application file for complete search history.

(56) References Cited

U.S. PATENT DOCUMENTS

| | | | | |
|---|---|---|---|---|
| 5,119,186 A | * | 6/1992 | Deacon et al. | 358/524 |
| 6,275,236 B1 | * | 8/2001 | Delahunty | 345/30 |
| 6,728,398 B1 | * | 4/2004 | Hondl | 382/162 |
| 2002/0145611 A1 | * | 10/2002 | Dye et al. | 345/543 |
| 2006/0282790 A1 | * | 12/2006 | Matthews et al. | 715/767 |
| 2007/0292021 A1 | * | 12/2007 | Caruso et al. | 382/166 |

* cited by examiner

*Primary Examiner*—Wesner Sajous
(74) *Attorney, Agent, or Firm*—Birch, Stewart, Kolasch & Birch, LLP

(57) ABSTRACT

A method of displaying color objects for the screen control display is provided. First, a plurality of elements and son elements on a screen control display respectively to a first level list and a plurality of second level lists is provided. Each of said elements of said first level list includes said son elements each of which composed of a foreground object and a background object in said second level lists. Then, a color mapping table having a plurality of group indexes is provided. Each of said group indexes is mapped into a corresponding palette having a plurality of color indexes. Finally, each of said elements with said group index and said color index is mapped for displaying colors of said foreground object and said background object of said element composed of said group index and said color index respectively.

7 Claims, 5 Drawing Sheets

| Group Index | Attributions |
|---|---|
| 0 ≀ 6 | Inactive |
| 7 ≀ 9 | Undefined |
| A | Active |
| B | Selected |
| C | Disable |
| D | System Defined |
| E F | Screen Control Display Usage |

| Palette | Group Index | Color Index | R | G | B | |
|---------|-------------|-------------|------|------|------|------|
| 1 | 0 | 0 | 00 | 00 | FF | ⇐ 藍 |
| | | ⋮ | ⋮ | ⋮ | ⋮ | |
| | | F | FF | 00 | 00 | ⇐ 紅 |
| ⋮ | ⋮ | ⋮ | ⋮ | ⋮ | ⋮ | |
| 3 | A | 0 | FF | 00 | 00 | ⇐ 紅 |
| | | ⋮ | ⋮ | ⋮ | ⋮ | |
| | | F | 00 | 00 | FF | ⇐ 藍 |
| ⋮ | ⋮ | ⋮ | ⋮ | ⋮ | ⋮ | |

FIG.4

METHOD OF DISPLAYING COLORS OF GRAPHIC OBJECTS ON SCREEN CONTROL DISPLAY

FIELD OF INVENTION

The present invention is related to a method of displaying colors of graphic objects, particularly to a method of displaying colors of graphic objects on a graphic user interface by means of grouping those graphic objects according to their attributions.

BACKGROUND OF THE INVENTION

In 21-century, our amusements become more various than ever before. People can acquire information of scenic spots around the world or enjoy those pleasured and famous films at home just through a digital video disc (DVD) player. Due to the efforts of the related industries, the techniques escalates into a state of art brings the people in both video and audio enjoyment as he or she are personal on the scene. For satisfying the user's demands, a variety of functions associated with a multimedia playback system are in common. In result, to make the user for operating multimedia playback system well and easily, the instruction menu, however, are miscellaneous rather than simple. Consequently, providing user operation steps as simple as possible become a goal for the related multimedia makers.

An on-screen display (OSD) to provide user an easy operation interface is a main stream. User can select his favorite profiles to operate his desired functions. In general, the screen control display includes a set-up menu and an on screen display. User can set easily his personal profile though monitor.

For purpose of providing user to view those available items which he can select, the icons with a variety of colors are typically used to provide user a good interface. Hence, screen control display usually provides user a set-up menu which is a hierarchical list including a plurality of elements composed of two portions: text and frame. Each element is shown through the color of foreground object, text font body, and color of the background object of the frame. Once one element of the list is selected, it will be highlight either through the color change of foreground or the background color to hint user the element being selected.

Referring to FIG. 1A, it shows three possible states for one element as "Selected", "Unselected", and "Disable", designed respectively, 101, 102, and 103 according to prior art. Obviously, only one of them is displayed on the screen control display at one time for one element, However, it still needs to store totally three graphic objects, each for one state. Hence, they not only occupy the space of the available memory but also become the screen control system resource. In the meantime, if the element is exchanged from one state to another, the state changes will become a heavy burden of the screen control system.

FIG. 1B shows a color mapping table including a plurality of color indexes and their corresponding colors according to the prior art. It shows a table includes fields of color indexes, and a series of palettes having three primary colors: red, blue, and green. The color index is formed by 8 bit binary decimal code (BCD), i.e., 8 bits to form 256 colors for one element color graphic object. Each color index is directed to a palette consisting of three primary colors given for a digital number, respectively. Each primary color is formed of two hex numbers. However, only small portions of them are selected for 256 color indexes. Hereinafter, anything data about coordinate on the screen, column height, row width, text font, and other similar format on the screen will be skipped.

To highlight a selected object, change of the colors of the foreground object and the background object may be more convenient. The color of each pixel for foreground object is exchanged with the background object. The color indexes for foreground and background objects are exchanged. Hence, according to prior art, as shown in FIG. 1B, while an element is updated from an unselected state into a selected state, it still becomes a heaving loading that the color of the foreground object is exchanged to the background object.

Moreover, to express the states of the objects in varying combination of 4 bits to produce 16 colors are usually found to cope with most of the requirements. Thus an object of the present invention is to provide a method for process the color graph objects in the setup menu to effectively decrease amount of data.

SUMMARY OF THE INVENTION

The present invention is to provide a method of displaying colors of graphic objects on a graphic user interface of a screen control display.

A method of displaying color objects for the screen control display is provided. First, a plurality of elements and son elements on a screen control display respectively to a first level list and a plurality of second level lists is provided. Each of said elements of said first level list includes said son elements each of which composed of a foreground object and a background object in said second level lists. Then, a color mapping table having a plurality of group indexes is provided. Each of said group indexes is mapped into a corresponding palette having a plurality of color indexes. Finally, each of said elements with said group index and said color index is mapped for displaying colors of said foreground object and said background object of said element composed of said group index and said color index respectively.

BRIEF DESCRIPTION OF THE DRAWINGS

The foregoing aspects and many of the attendant advantages of this invention will become more appreciated as the same becomes better understood by reference to the following detailed description, when taken in conjunction with the accompanying drawings, wherein:

FIG. 4 shows a color mapping table having group indexes, palettes, and color indexes according to the present invention.

DETAILED DESCRIPTIONS OF THE INVENTION

The present invention is to provide a method of displaying colors of graphic objects on screen control display. In the method, the color of an element is expressed by two hex numbers. One hex number for group index and another hex number for color index are replaced for using two hex numbers to express one color index depicted in the background of the invention. Thereafter, to change the color of an element, when the element changes its attribution, the group index changed is the only one need to be done. Thus it can significantly decrease amount of data to be processed.

Figure 1:
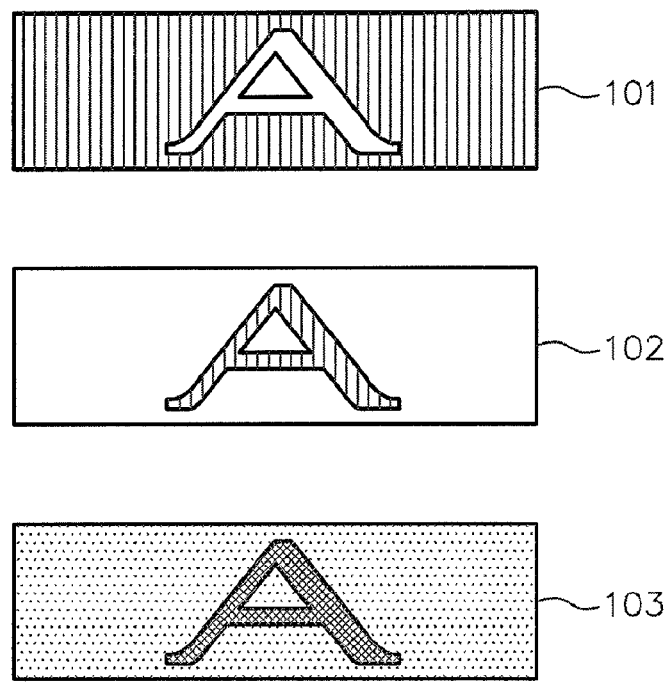
FIG. 1A shows an example of displaying an element on a screen control display having three possible statuses.
FIG. 1B shows a color mapping table including color indexes and their corresponding colors according to the prior art.
Figures 2, 3:
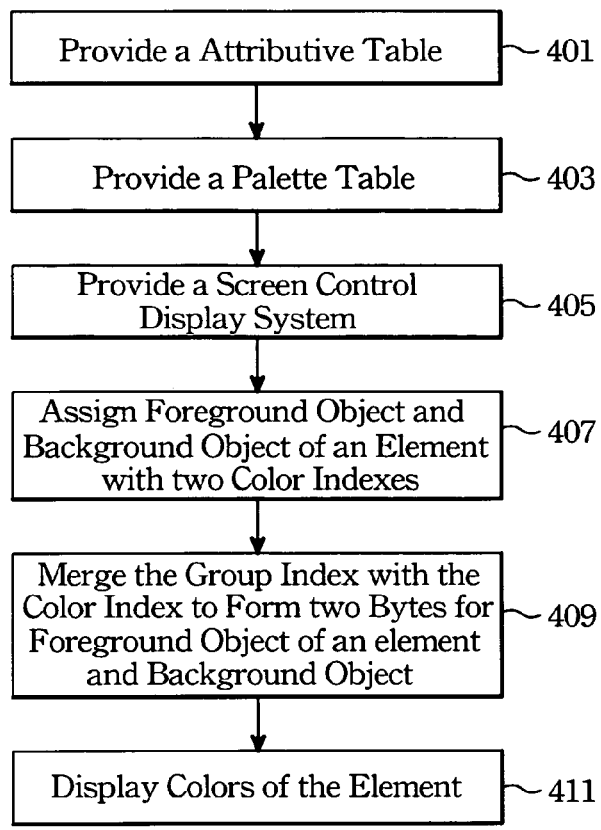
FIG. 2 shows a flowchart to display the colors of the elements on the screen control display.
FIG. 3 shows an attributive table having group indexes and their corresponding attributions according to the present invention.

FIG. 2 shows a flowchart for processing the color of element on screen control display in accordance with a preferred embodiment of the present invention. At first, an attributive table is provided with group indexes shown in FIG. 3 in step 401. The attributive table includes two columns: one column is for group indexes arranged in ascending order from 0 to F (in hex) and another column is for attributions. The example shows the attributions are classified into 7 group indexes including: G=0 to 6 represented for "inactive state"; G=7 to 9 represented for "undefined"; G=A represented for "active state"; G=B represented for "selected state"; G=C represented for "disable state"; G=D represented for "system defined"; G=E, F represented for "OSD defined usage".

In accordance with a preferred embodiment of the present invention, "System Defined" represents those are displayed on the screen without change. "OSD defined usage" represents on-screen display. The "undefined is provided for user definition. The "disable state" represents the system or the multimedia supported in a function. For instance, a DVD player usually supports multi-languages and the DVD disk which user puts in the DVD player only supports Chinese, so user finds Chinese the only one language can be chosen to be shown or not shown. Others languages cannot enable to be shown in the DVD player.

Still referring to FIG. 2, a palette table having several palettes is provided (step 403). One palette corresponds with one kind of attributions and has 16 color numbers arranged in a predetermined order. Thus, if two group indexes with different attributions, the palettes associated them will differ. For instance, the first palette for group index 0 are different from the third palette for group index A. FIG. 4 shows a color mapping table formed by merging the attribution table and the palette table according to the present invention. In color mapping table, each group index mapping to a palette which has 16 color indexes. Each of the color indexes is directed to a color number mixed with three digital numbers, respectively, for red, green, and blue.

Figure 5:
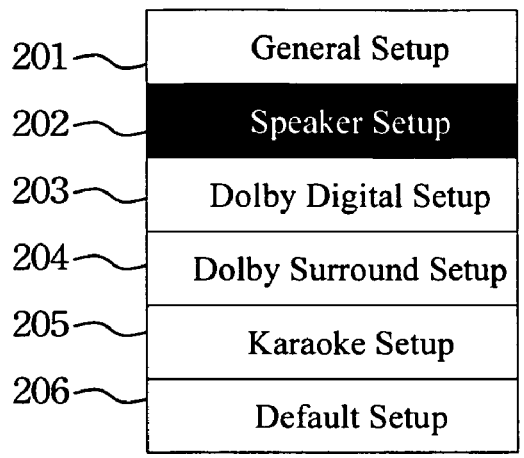
FIG. 5A shows a first level list of a setup menu on screen control display.
FIG. 5B shows a second level list of a setup menu on screen control display.
Figure 5:
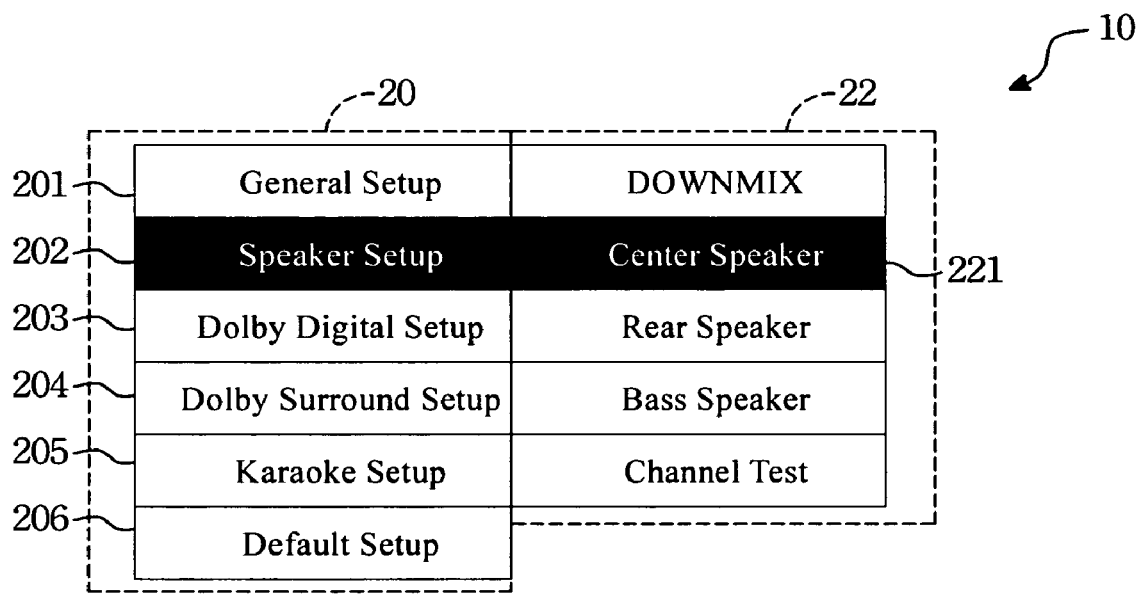

Afterward, in step 405, a screen control display system 10 is provided with reference to FIG. 5A, which shows an exemplary set up menu of DVD player. The screen control display system provides a first level list 20, which includes six elements including "General Setup", "Speaker Setup", "Dolby Digital Setup", "Dolby Surround Setup", "Karaoke Setup", and "Default Setup". Every element has a text frame in correspondence. Every element may have none, one, or more son elements to form a second level list 22 shown in FIG. 5B. For instance, the element "speaker setup" has the son elements: "DOWNMIX mode", "Center Speaker", "Back Speaker", "Bass Speaker", and "Channel Test." Surely, more than two levels are also possible if it is necessary though the example shown in FIG. 5B, is the first level list 20 and the second level list 22. Every element is composed of a foreground object and a background object. The foreground object and background object are displayed for their colors according to the color index and the group index.

In step 407, the foreground object and background object of each text of each element are given with two color indexes in the same group index. Still referring to FIG. 5A, when an user presses the setup key (not shown) to enter the first level list 20, a default element is set to be as active state by the screen control display system 10. The others are either in inactive state or in disable state. Surely, user can assign any chosen son-element which is in the inactive state to be as an active state. For instance, as the user choose "Speaker Setup" and thus it becomes in active state. By contrast, the state of the "General Setup" will become inactive. Since "Speaker Setup" is associated with the second level list 22, the screen control display system 10 will switch the group index from inactive state (G=0~6) to selected state (G=B) shown in FIG. 3.

Referring to FIG. 5B, the screen control display system 10 will further make a son element, "DOWNMIX Mode" of the "Speaker Setup" into active state, the other son elements on the second level 22 will be in inactive states. User can assign "Center Speaker" with the text frame 221 as active state. The "DOWNMIX Mode" will change from active state to inactive state. Following forgoing rules, the screen control display system 10 can cope with those level lists over two.

Figure 6:
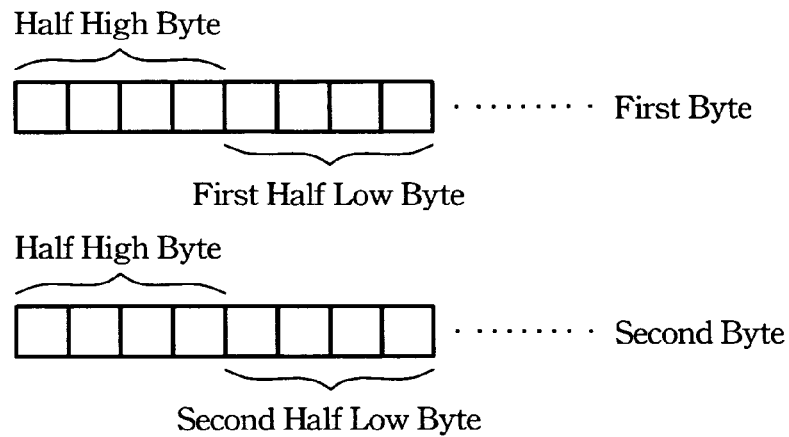
FIG. 6 shows the color numbers of an element is determined by a first byte and a second byte data.

Turning back to FIG. 2, 4 bits BCD are merged from the group index number with 4 bits BCD and the color index to a byte in step 409. FIG. 6 depicts an example. The 4 bits BCD of a group index then as a half high byte are merged with 4 bits BCD of a color index as a half low byte by the screen control display system 10. Since each text of each element consists of a foreground object and a background object, thus it requires two bytes to express the color of the element. Afterward, the screen control display system 10 displays the colors of the foreground object and the background object according to the first byte and the second byte, please see the step 411.

Figure 7:
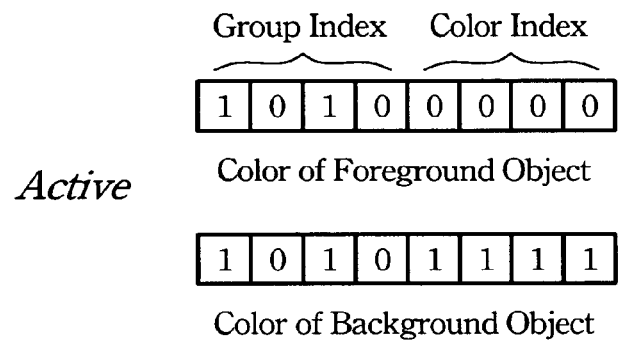
FIG. 7A shows the color number of the foreground object being determined by a first byte composed of a group index as a half high byte and a color index as a half low byte and the background object being determined by a second byte when the group index is 1010.
FIG. 7B shows the color number of the foreground object being determined by a first byte composed of a group index as a half high byte and a color index as a half low byte and the background object being determined by a second byte when the group index is switched to 0000.
Figure 7:
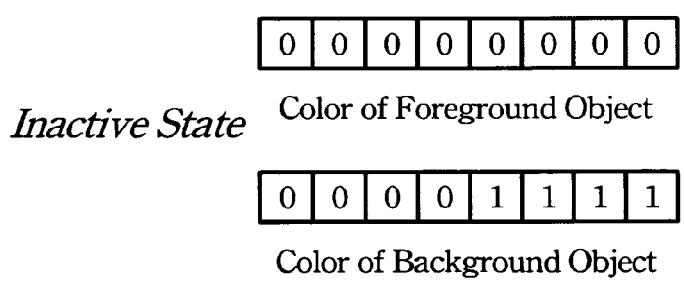

Referring to FIG. 7A, FIG. 7B, and FIG. 4, a son element is changed from an active state to an inactive state. It shows the son element has a blue foreground color (color index=0) and a red background color (color index=F) and the group index number G=0 to represent the son element is inactive state. When the son element is changed to active state (G=A), the foreground color and background color are exchanged as shown in FIG. 4. The son element has a red foreground color and a blue background color in inactive state. Hence, according to the present invention, changing the group index number can make the colors of the foreground and background of the element exchanged.

The present invention has the following advantages.
1. the colors of an element can be exchanged into another just by changing a half high byte (group index) according to its attribution. Thus it can decrease the burden of the screen control display system.
2. the present invention can save the memory and provide a fast switch rate.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded to the broadest interpretation so as to encompass all such modifications and similar structure.

What is claimed is:

1. A method of displaying color objects for a screen control display comprising a hardware processor, the method comprising the steps of:

providing a plurality of elements and son elements on a screen control display respectively to a first level list and a plurality of second level lists by said hardware processor, wherein each of said elements of said first level list comprises said son elements, furthermore, each of said elements and son elements composed of a foreground object and a background object in said second level list;

providing a color mapping table having a plurality of group indexes by said hardware processor, each of said group indexes being mapped into a corresponding palette having a plurality of color indexes;

mapping each of said elements with said group index and said color index by said hardware processor for displaying said foreground object and said background object of said element wherein said foreground object and said background object of said element consists of said group index and said color index respectively; and displaying said plurality of elements and son elements on said screen control display.

2. The method according to claim 1, wherein said foreground object and said background object have the same said group index when said foreground object and said background object belongs to the same element.

3. The method according to claim 1, wherein said color indexes have 16 color indexes.

4. The method according to claim 1, wherein said group indexes are classified respectively to corresponding attributions.

5. The method according to claim 4, wherein said attributions indicates whether said foreground object and said background object of the element are provided for displaying colors.

6. The method according to claim 1, wherein different color arrangements according to said group indexes are to let said color of said foreground object and color of said background object of said element be exchanged as said attribution being changed.

7. A method of displaying color objects for a screen control display, the method comprising the steps of:

providing a plurality of elements and son elements on a screen control display respectively to a first level list and a plurality of second level lists, wherein each of said elements of said first level list comprises said son elements, furthermore, each of said elements and son elements composed of a foreground object and a background object;

providing a color mapping table having a plurality of palettes, group indexes, each of which is mapped into a corresponding palette having a plurality of color indexes, wherein said color mapping table provides different colors if group indexes are different even color index is the same;

mapping every foreground object with one of said group indexes and with one of said color indexes and every background object with one of said group indexes and with one of said color indexes;

displaying said foreground objects and said background objects associated colors therewith of said elements and said son elements while displaying in accordance with results of said mapping;

changing colors of an element to another if said element whose attribution is changed by changing its group index corresponded; and changing colors of a son element to another if said son element whose attribution is changed by changing its group index corresponded.

* * * * *